US008156384B2

(12) United States Patent
Helmecke et al.

(10) Patent No.: US 8,156,384 B2
(45) Date of Patent: Apr. 10, 2012

(54) COMMUNICATIONS ADMINISTRATION METHOD AND SYSTEM FOR AN ELECTRONIC APPARATUS

(75) Inventors: Sven Helmecke, Moehrendorf (DE); Bernd Kalnischkies, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 110 days.

(21) Appl. No.: 12/536,611

(22) Filed: Aug. 6, 2009

(65) Prior Publication Data
US 2010/0037103 A1   Feb. 11, 2010

(30) Foreign Application Priority Data
Aug. 6, 2008   (DE) .................. 10 2008 036 654

(51) Int. Cl.
G06F 11/00   (2006.01)
(52) U.S. Cl. .......................................... 714/48; 714/49
(58) Field of Classification Search .................... 714/48, 714/49
See application file for complete search history.

(56) References Cited

U.S. PATENT DOCUMENTS

| 5,870,746 A * | 2/1999 | Knutson et al. ............. 1/1 |
| 6,925,586 B1 * | 8/2005 | Perrella et al. ............. 714/57 |
| 7,016,954 B2 * | 3/2006 | McKenzie et al. ............. 709/224 |
| 7,464,159 B2 * | 12/2008 | Di Luoffo et al. ............. 709/224 |
| 7,474,623 B2 * | 1/2009 | Boyd et al. ............. 370/242 |
| 7,523,361 B2 * | 4/2009 | Kuhmann et al. ............. 714/57 |
| 7,624,212 B2 | 11/2009 | Helmecke et al. |
| 7,703,158 B2 * | 4/2010 | Wilker et al. ............. 5/616 |
| 7,823,053 B2 * | 10/2010 | Bhamidipaty et al. ......... 714/799 |
| 7,900,094 B2 * | 3/2011 | Marinucci ............. 714/46 |
| 2004/0078724 A1 * | 4/2004 | Keller et al. ............. 714/48 |
| 2007/0174733 A1 * | 7/2007 | Boyd et al. ............. 714/48 |
| 2008/0141066 A1 * | 6/2008 | Wood et al. ............. 714/4 |
| 2008/0155144 A1 * | 6/2008 | Helmecke et al. ............. 710/72 |
| 2008/0270853 A1 * | 10/2008 | Chagoly et al. ............. 714/49 |
| 2009/0013222 A1 * | 1/2009 | Di Luoffo et al. ............. 714/57 |
| 2009/0168806 A1 * | 7/2009 | Van de Steeg et al. ........ 370/498 |
| 2009/0187796 A1 * | 7/2009 | Adams et al. ............. 714/48 |
| 2010/0146347 A1 * | 6/2010 | Allen ............. 714/48 |
| 2010/0205486 A1 * | 8/2010 | Chiu et al. ............. 714/48 |
| 2010/0229024 A1 * | 9/2010 | Hawkins et al. ............. 714/2 |

OTHER PUBLICATIONS

"CANopen." Wikipedia: The Free Encyclopedia. Wikimedia Foundation, Inc. Jun. 18, 2008. <http://en.wikipedia.org/w/index.php?title=CANopen&oldid=220094915>.*

* cited by examiner

Primary Examiner — Robert Beausoliel, Jr.
Assistant Examiner — Joshua P Lottich
(74) Attorney, Agent, or Firm — Schiff Hardin LLP

(57) ABSTRACT

In a method, a computer-readable medium encoded with programming instructions, and a system for the administration of error messages of electronic, medical technology peripheral apparatuses that are in communication via a CANopen interface, a device configuration file is extended by a message object. The message object can be configured in advance. At run time the message object is then imported and used in the processing or in the administration of a detected error message. The detected error message is parameterized (and thus specifically processed) using the detected message object.

15 Claims, 2 Drawing Sheets

FIG 3

[Msg0001]
MsgName = PowerOFF
MsgSourceName = PowerStatus
MsgSourceMask = 0x01
MsgTriggerValue = 0x01
MsgTriggerType = 0
MsgOccurrence = 0
MsgOccurrenceInhibitTime = 0
MsgAppearance = 0xA
MsgSeverity = 2
MsgTextReferenceFile = AmpError.dll

COMMUNICATIONS ADMINISTRATION METHOD AND SYSTEM FOR AN ELECTRONIC APPARATUS

BACKGROUND OF THE INVENTION

1. Field of the Invention

The present invention is in the field of medical technology and in particular concerns the handling of errors or error messages of peripheral apparatuses within a complete system, which are connected with one another via a network.

2. Description of the Prior Art

Medical technology systems today normally are composed of multiple associated apparatuses that are respectively engaged in data exchange with one another via a network such systems, for example, are magnetic resonance tomography systems, computed tomography systems, etc. with peripheral apparatuses (for example injectors, laboratory finding apparatuses, blood pressure measurement apparatuses or additional peripheral apparatuses) arranged in relation to the imaging apparatus. In order to be able to correct for the failure of an apparatus due to the occurrence of an error as quickly as possible, and in order to avoid additional consequential errors in the entire system, it is necessary to take precautions as to how error messages from technical apparatuses are handled. For this purpose, cases must be established for which an error message should appear, as well as the form of the error message and what effects follow therefrom including what additional processes in the network are affected. It should be taken into account that error messages must normally be interpreted depending on context. This means that it is less productive or meaningful when an error message is merely considered by itself. By contrast, it is important for the entire context of the respective apparatus that has caused an error message to be considered. This is particularly important for systems of modular design that have multiple sub-components.

The processing of error messages is not static, but rather is normally subject to change in the course of time. For example, it is frequently the case that an error message that is originally (initially) viewed as very important loses importance with the passage of time, and therefore should no longer be indicated with an emphasized presentation, but rather should require a different, modified processing.

The processing of error messages (in particular the display of error messages) is therefore of particular importance for the entire system, since an error with high priority should also be shown as such and in an emphasized manner in order to trigger fast error handling routines as quickly as possible.

For medical technology peripheral apparatuses that are in use today it is known to process device error messages via a central monitoring software. The monitoring software is typically a component of the system software and is provided as a comprehensive hierarchy across the peripheral apparatuses. Through the processing of the error messages of the peripheral apparatuses at such a centralized level, it is possible to detect the effects of the respective error message on the entire system. However, the disadvantage of this architecture concept is that any changes with regard to the processing of the error messages always entails a detailed change of the system software. In other words, this has the consequence that the entire system software must be adapted every time to a change in the processing of an individual error message of a peripheral apparatus is desired. This leads to errors and also to an unsatisfactory situation since the adaptation of the system software often remains undone, such that the error messages can no longer be processed according to the newest state of the system.

SUMMARY OF THE INVENTION

An object of the present invention is to provide a method and system wherein the processing of error messages of medical technology peripheral apparatuses can be improved and simplified. Moreover, the processing of error messages of these apparatuses should be made more flexible.

The achievement of this object with regard to the method is described in the following. Features, advantages and alternative embodiments are applicable to the other forms of the invention, and vice versa. Those other forms include a medical system and a computer-readable medium encoded with programming instructions that implement the described method and all embodiments thereof.

The object is achieved by a method for the administration of error messages that are output in connection with an electronic apparatus that has an address-oriented access mechanism (addressable access) to apparatus variables. An apparatus configuration file that is expanded with a message object according to the invention is provided with the apparatus. The method includes the following method steps of importation of the message object with message object parameters from the extended apparatus configuration file, interception of an error message, parameterization of the intercepted error message with the imported message object parameters of the message object, and administration of the parameterized error message.

This method mentioned is implemented by a computer (processor) and serves for the administration of messages.

In a preferred embodiment, the messages are error messages of the electronic apparatus, but they can alternatively be messages of other types that have a different content, for example information messages, status messages, etc.

According to a preferred embodiment, the electronic apparatuses are medical technology peripheral apparatuses that have an address-oriented access mechanism to device variables. For example, these can be apparatuses that communicate according to the CANopen standard. CANopen is a communication protocol that originates from automation engineering and is used for networking and communication of electronic apparatuses. Given apparatuses that communicate according to the CANopen standard, it is necessary to use electronic data sheets. These are electronic files that are stored in a standardized format in order to provide metadata with regard to the respective apparatus. An additional configuration file (known as a device configuration file) is generated from this file (the electronic data sheet). The device configuration file is also a configuration file in which a manufacturer of the respective apparatus can provide additional information for utilization. According to the invention, this configuration file is now extended so that it includes a message object.

The message object is an information technology entity embodying a number of message object parameters. As used herein, "message object parameters" are those parameters that are relevant to the layout or the presentation of the respective error message, as well as parameters that are relevant to the evaluation or the weighting of the respective error message, and parameters relevant to the further handling or processing of the error message. For example, parameters that establish how (for example as a pop-up window) and where the error message should be stored and under what conditions are among such parameters. The list of possible message object parameters can be dynamically configured and expanded.

As used herein "parameterization" of the intercepted error message with the imported message object parameters of the message object means that the intercepted error message is compared with the current and respective newly imported message object parameters. In other words, after a detection (recording) of an error message it is determined how this error message should be administered or processed. Message object parameters are defined in order to specify the processing or administration.

As used herein, "administration" encompasses all forms of processing of error messages beginning with the presentation of the respective error message in the associated form and manner. This also includes an evaluation of the relevance or the importance of the respective error message. This feature is particularly important in complex systems in which the number of error messages must be prioritized with regard to their relevance. In more complex embodiments of the invention, the administration can also include storage of the error message and subsequent additional processing of the stored error message. The additional processing can include additional recovery strategies and initiating additional measures with regard to the error message. The configuration files are typically individually provided in the file according to the CANopen standard (electronic data sheet and device configuration file). It is also possible to provide the corresponding information from the configuration files not in a separate single file, but rather distributed across (among) multiple files.

As was mentioned in the preceding, the preferred embodiment of the present invention pertains to apparatuses that communicate according to the CANopen standard. Other standards are likewise alternatively possible, for example the USB standard, etc.

According to a preferred embodiment of the invention, the message object parameters comprise information for the administration of the respective error message. This information in particular concerns the type of presentation of the error message, the evaluation of the error message using configurable priority criteria and additional information for the display of the error message. The message object parameters in particular comprise error message identifiers, error message source information, trigger information, layout information and/or error evaluation information. The administration (in particular the presentation of the error message) is executed depending on the message object parameters. This has the advantage that how specific error messages are to be handled can be defined at a higher abstract level. It is therefore possible to generically and commonly handle specific groups of error messages without having to process the specific error message in the individual case. Moreover, via the provision of the message object with which the configuration file is extended it is also possible for previous messages to be handled in a modified manner, or for new messages to be inserted without having to adapt the system software.

According to a further aspect of the present invention, the layout information includes information about the form in which the error message should be displayed at a configurable presentation location. The layout information can also refer to how error messages should be displayed in relation to different presentation locations. According to a preferred embodiment of the invention, a database is provided with rules that define the relations that exist among the message object parameters. For example, one rule can be directed to requiring a specific presentation form for all error messages that are weighted with highest priority, for example a requirement that these must always be presented as pop-up windows in order to indicate the relevance of the respective error message. Other, less important error messages can be executed in the form of a simple notification to the user.

In a preferred embodiment, the method is fashioned so that the message object with the message object parameters is in principle imported at every system startup. This ensures that the message object is always imported when the respective associated apparatus is started, or when the system in which the respective apparatus is embedded is started. As an alternative, it is possible for the message object parameters to be imported after configurable events. For example, it is possible for a user to define that the message object is always imported when it has been modified. Other import criteria can likewise be dynamically established.

In the preferred embodiment, the format of the message object corresponds to the typical CANopen standard.

In addition to the message object parameters mentioned in the preceding, additional message texts can optionally be integrated into the message object. For example, these can thereby be message texts that should identify a group of messages summarized for the user. Moreover, it is possible to provide message texts in different languages. A reference to another message can likewise be provided.

According to a preferred embodiment of the invention, the administration of the respective error message ensues in a context-sensitive manner. In other words, the overall state of the system in which the electronic apparatus is located is taken into account. For example, error messages that are output by life-extending apparatuses are evaluated with the highest relevance over error messages from laboratory apparatuses that have no relevance to the life of a patient. In other words, which error messages should be presented in which manner can be established uniformly at a higher level. The presentation of error message can therefore be standardized, and it is possible to form specific groups of error messages that have the same or a similar situation context and should be administered identically. All error messages that thus have such a situation context are then presented uniformly. This distinctly simplifies and improves the use of the system.

In contrast to previous error message systems from the prior art, with the method according to the invention it is possible to form error message groups. The presentation of a group is controlled depending on the association of an error message with that specific group. It is normally provided that all error messages with high priority are also displayed with particular emphasis while less important error messages can also be displayed in the form of a simple message. The selectable form is configurable.

According to an additional aspect of the present invention, the administration includes a modification and/or a deletion of already-existing error messages. Moreover, it is possible for new error messages to be integrated into the system without having to modify a system software. With the solution according to the invention it is thus possible for an error message that is newly received at one apparatus due to a specific error event to be also immediately available at the other apparatuses. This distinctly increases the flexibility of the system.

The message object can also be dynamically varied. The message object parameters can thus always be reconfigured again. The most current version of the message object is used. According to a further embodiment of the present invention, that the presentation location for the presentation of the error message can also be configured. It is therefore possible, for example, for important error messages to also be shown at a relatively high position in the system (for example at the system administrator level, or for example on all connected apparatuses in order to increase the number of users that read this error message). By contrast, if the error message is of lower relevance, the number of the presentation locations can be minimized. In order to be able to estimate the relevance of the respective error message with sufficient detail, rules are provided in which it is established how the error messages should be administered depending on their importance (or on evaluation or relevance).

The above object is also achieved by a computer-readable medium and a system configured to implement the above-described method. In addition to the electronic apparatuses, the system has a storage medium in which a configuration file is stored that includes a message object and a text streamer that imports the respective, updated message object, and the error message, dependent on the conditions read out from the storage medium and the text streamer, is administered and displayed.

BRIEF DESCRIPTION OF THE DRAWINGS

FIG. 3 shows an example of a message object according to a preferred embodiment of the invention.

DESCRIPTION OF THE PREFERRED EMBODIMENTS

Figure 1:
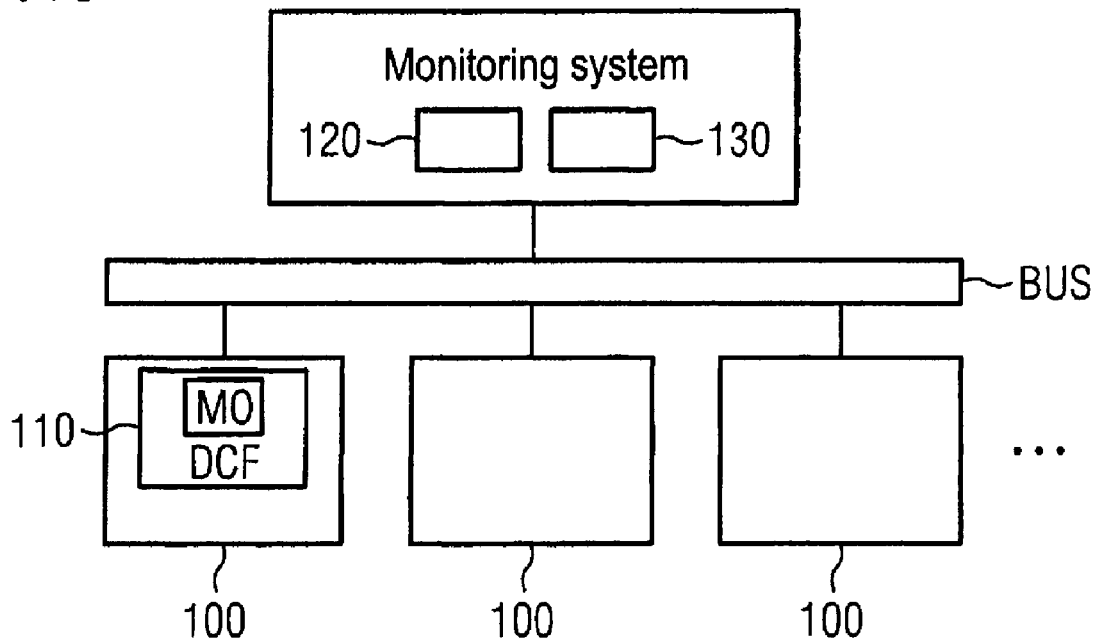
FIG. 1 is an overview presentation of components of a system according to the invention.

The basic components of the present invention are shown in FIG. 1. The invention proposes a generic mechanism in order to administer error messages of electronic CANopen apparatuses 100 at a central level without intervening in or, respectively, changing the system software. A monitoring software that serves to administer error messages of multiple, decentrally arranged electronic apparatuses is typically integrated into the system software. A modification to the system software is connected with relatively high cost since normally a system administrator is necessary for this purpose, and since this cannot be executed at the electronic apparatus 100 from a decentralized location (on site, so to speak). The monitoring software within the system software is designated with a square box in FIG. 1, which square box is arranged over an interface (shown in the middle). In the preferred embodiment the interface is a CANopen bus BUS. However, other interfaces can be provided in other embodiments in order to connect the electronic apparatuses 100 to a central administration instance, for example via USB interfaces.

The system according to the invention thus has a storage medium 110 on which is stored the apparatus configuration file DCF. The storage medium 110 can advantageously also be arranged in the electronic apparatus. However, the storage medium 110 can also be placed at an external instance that is engaged in data exchange with the electronic apparatus 100. In principle, it is insignificant whether the configuration file DCF is fashioned as a separate file or is distributed across multiple files.

Moreover, the system has a text streamer 120 that imports a message object MO from the expanded apparatus configuration file DCF and an event handler 130 that intercepts and parameterizes the error message. The text streamer 120 and/or the event handler 130 can be fashioned in the same instance but also in different instances. They can be fashioned in the electronic apparatus 100; alternatively, they can be fashioned in the central monitoring system, or in an instance that is likewise connected with the system via the CANopen bus BUS.

For apparatuses that are configured according to the CANopen standard, it is provided that an electronic data sheet EDS is provided. The electronic data sheet is typically provided by the manufacturer and for its part generates an additional file, what is known as a device configuration file DCF. The device configuration file DCF and electronic data sheet EDS are configuration files. According to a preferred embodiment of the present invention, the device configuration file DCF is extended with a message object MO. Information that is relevant with regard to the presentation and with regard to the evaluation or to the additional processing of the error message is provided in the message object MO.

An example of an extended message object MO is shown in FIG. 3.

According to a preferred embodiment of the invention comprises the message object MO comprises the following information:

- A symbolic name of the message. This name should identify the message within the entire system and must be unique.
- Apparatus data from which the message is derived. This is identified with the designation "MsgSourceName" in FIG. 3. Here a parameter or multiple parameters can be identified from which the message should be derived. This parameter is completely described by default within the configuration file DCF with regard to addressing and access option.
- Trigger information that triggers a message. This is thereby information or, respectively, conditions that establish when a message has to occur. This is identified in FIG. 3 with the designation "MsgTriggerValue". In order to be able to trigger individual bits or, respectively, groups of bits, a mask is defined that is linked with the parameters to be examined via an AND link. The message is triggered when the masked parameter corresponds to the trigger value. Alternatively, here other logical operators can be used in addition to the AND link mentioned in the preceding.
- Moreover, different trigger types can be differentiated. For example, "0" can identify a riding edge, "1" can identify a falling edge and "2" can identify a level.
- Furthermore, the frequency of the occurrence of error messages can be identified. Moreover, it is possible to limit the transmission of error messages or, respectively, to vary the frequency. For example, whether the message is in principle transmitted at every occurrence of the error or only at the first occurrence of the error, or for example in the event that additional system-specific conditions are satisfied, can thereby be configured. Moreover, a combination of the preceding conditions can also be configured. For example, it could be defined that a message is in principle transmitted only at the first occurrence in the event that additional, system-specific conditions are satisfied. An interval time can also be defined that defines a time interval between the transmission of two successive error messages. A minimum time delay can be configured here so that it is ensured that error messages do not directly follow one another but rather are spaced apart from one another by a minimum time delay. However, this is optional.
- The manner of the presentation of the error message in the system. How the error message should be presented in the system is defined in this parameter. The entry is interpreted bit-by-bit; it is thereby possible to allow multiple presentation forms in parallel or, respectively, simultaneously, so to speak. In a preferred embodiment of the present invention, the following configuration possibilities are preconfigured for the presentation: a status window; a pop-up window; a pop-up window to be confirmed; and what is known as a log file. Other embodiments provided additional presentation types here. At this point it is noted that the user can in principle configure additional presentation possibilities in order to be able to adapt the system to his specific requirement conditions. Given the presentation in the form of a status window, the error message is presented to a user in a window on the screen that is accessible to said user. The same applies for the pop-up window, which likewise appears on the screen. Given a pop-up window that is to be confirmed, the user must confirm the respective message in the pop-up window in order to be able to continue to work. The message is stored in a system-specific log file in the log file.

Rating (weighting) of the messages. The effect the message has on the respective entire system is established here. The type of rating can be configured. According to a default setting or, respectively, pre-configuration, three ratings are differentiated. The first level is merely information, while warnings are dealt with at a higher and second level. Error messages are dealt with at a third and even higher level.

Additional meta-information that can be edited via text fields. Message texts can likewise be defined here in the DCF file DCF. Different text fields are differentiated: there is a text field that provides a rough context for the user.

Additional text fields can be provided for service use. For example, detailed explanations with regard to the message are conceivable here. Additional steps to be executed can likewise be explained. Moreover, additional meta-information with regard to the message can be provided. At this point it is noted that the message texts can be provided in different languages. A corresponding reference to the language can be configured.

A basic workflow of the method according to the invention according to a preferred embodiment should be explained in the following in connection with FIG. 2.

Figure 2:
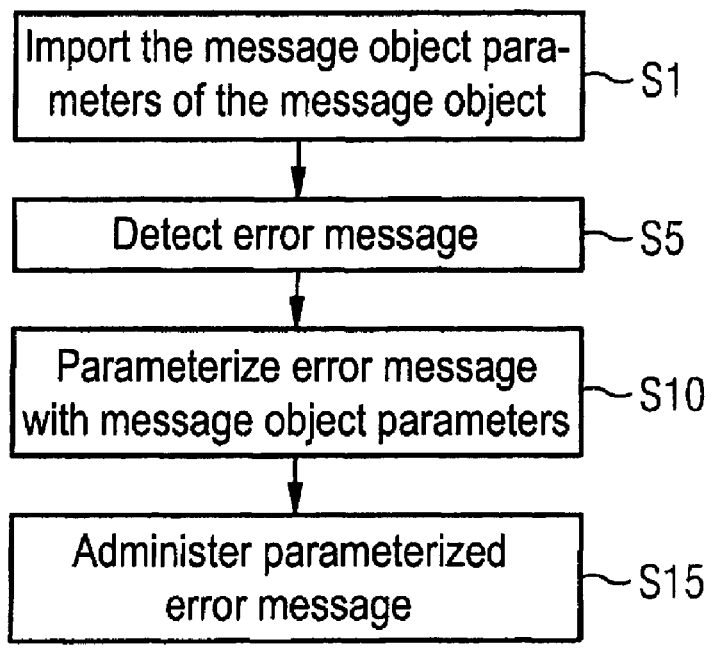
FIG. 2 is a schematic representation of a workflow according to a preferred embodiment of the invention.

Message object parameters of the message object MO are imported from the expanded apparatus configuration file DCF in a first step that is designated as S1 in FIG. 2. The error message is recorded or intercepted in a next step. That is designated as Step S5 in FIG. 2.

In an additional step, the recorded or, respectively, intercepted error message is parameterized with the imported message object parameters. This is designated as step S10 in FIG. 2. Following this is the administration of the error message in the parameterized form as a last step S15. In other words, the administration of the error message ensues using the preceding parameterization of the same.

Due to the extension of the configuration file DCF according to the invention with message objects MO, device messages can be handled at a higher level, for example at a system level but without affecting the system software. In particular, the appearance, the trigger and the processing of error messages can be uniformly configured and handled in the entire system. This produces an advantage that has proven to be very significant in practice, namely that the user of the respective apparatus 100 can implement a generic monitoring program that loads the necessary information from the respective apparatus description in a configuration step. This advantageously ensues wholly automatically, thus without additional user interaction. Moreover, the changing of existing error messages and the insertion of new messages is very simple and is most of all possible without adaptation of the system software. The modification, deletion and/or integration of new error messages advantageously ensues automatically.

In connection with FIG. 2 it is noted that the method according to the invention can in principle be divided into two phases. A definition phase is provided in which step S1 is classified. The other steps S5, S10 and S15 occur in a second phase, what is known as a runtime phase. The two phases can be temporally decoupled from one another. In other words, what handling should be provided for the respective error message can be established in advance in the definition phase. The message object MO is correspondingly configured. A structured description of the messages can therefore already be made at a very early point in time, and optimally with the respective component vendor. This improves the assignment enormously and can already avoid the occurrence of severe error states in advance.

The respective error messages are then detected at runtime (or, respectively, in the runtime phase and parameterized and correspondingly administered using the message object parameters of the message object MO that are defined in the definition phase. In one advantageous development of the invention it is provided that the definition phase is expanded so that definitions or, respectively, configurations with regard to the message object MO can be executed even at run time. The flexibility of the system is therefore extended.

With the proposal according to the invention it is possible that the apparatuses 100 of the apparatus system can therefore be used in a distinctly simpler manner since the user only needs to become familiar with one (uniform) handling of messages. The administration of the error message comprises: a presentation or, respectively, display of the error message on a monitor; the type of presentation (size, location of the presentation in the form of a list or in the form of a window, etc.); presentation location within the system (should the error message be shown only on the respective specific apparatus 100, or should the error message also be forwarded to the administrator at a system level etc.); the duration of the presentation of the respective error message; configurable events that must be fulfilled so that the error message is shown at all in the first place; system conditions that must be fulfilled so that the error message is shown in a specific form; and/or conditions in relation to other electronic apparatuses 100 that must be satisfied so that the error message is displayed. However, the preceding enumeration is not exclusive and can be freely configured and expanded at any time, in particular according to the respective user.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for administering error messages having addressable access to device variables comprising:

providing a plurality of CANOpen medical apparatuses and interfacing said CANOpen medical apparatuses to communicate with each other according to the CANOpen standard via a CANOpen bus;

configuring said CANOpen medical apparatuses with an electronic device configuration file according to the CANOpen standard, and extending said device configuration file to include a message object therein and message object parameters associated with the message object, to produce an extended device configuration file;

importing of the message object with the associated message object parameters from the extended device configuration file into the CANOpen medical apparatuses at a time selected from the group consisting of a time at which each of said CANOpen medical apparatuses is started, an automatically selected time, and a time designated by a user-implemented input into each of said CANOpen medical apparatuses;

intercepting an error message at one of said CANOpen medical apparatuses when the error message occurs at said one of said CANOpen medical apparatuses;

parameterizing the intercepted error message in one of said CANOpen medical apparatuses using the imported message object parameters of the message object to produce a parameterized error message; and automatically electronically responding to the error message by administering the parameterized error message.

2. A method as claimed in claim 1 comprising employing message object parameters selected from the group consisting of error message identifiers, error message source information, trigger information, layout information, and error evaluation information, and wherein the step of administering said parameterized error message comprises controlling the response to the error message dependent on said message object parameters.

3. A method as claimed in claim 2 wherein said message object parameters include layout information, and employing, as said layout information, instructions that define a presentation location for the error message and a presentation format for the error message, and wherein the step of administering said parameterized error message includes displaying the error message according to said layout information.

4. A method as claimed in claim 1 comprising generating said device configuration file from an electronic data sheet.

5. A method as claimed in claim 1 comprising including, in said message object parameters, a definition field that provides metadata in a definable format.

6. A method as claimed in claim 1 comprising administering said parameterized error message by at least one of modifying existing error messages, deleting existing error messages, and generating new error messages.

7. A method as claimed in claim 1 comprising administering said parameterized error message at a presentation location defined by the parameterized error message.

8. A non-transitory computer-readable storage medium encoded with programming instructions for administering error messages in a system comprising a plurality of CANOpen medical apparatuses and an interface allowing said CANOpen medical apparatuses to communicate with each other according to the CANOpen standard via a CANOpen bus, said programming instructions causing said system to:

configure said CANOpen medical apparatuses with device configuration file according to the CANOpen standard, to include a message object therein and message object parameters associated with the message object, to produce an extended device configuration file;

Import the message object with the associated message object parameters from the extended device configuration file into the CANOpen medical apparatuses at a time selected from the group consisting of a time at which each of said CANOpen medical apparatuses is started, an automatically selected time, and a time designated by a user-implemented input into said CANOpen medical apparatuses;

intercept an error message at one of said CANOpen medical apparatuses when the error message occurs at one of said CANOpen medical apparatuses;

parameterize the intercepted error message in one of said CANOpen medical apparatuses using the imported message object parameters of the message object to produce a parameterized error message; and automatically respond to the error message by administering the parameterized error message.

9. A system for administering error messages comprising:

a plurality of CANOpen medical apparatuses and an interface allowing said CANOpen medical apparatuses to communicate with each other according to the CANOpen standard via a CANOpen bus;

a memory containing an electronic device configuration file according to the CANOpen standard;

a processor configured to extend said device configuration file to include a message object therein and message object parameters associated with the message object, to produce an extended device configuration file;

said processor being configured to import the message object with the associated message object parameters from the extended device configuration file into said CANOpen medical apparatuses at a time selected from the group consisting of a time at which each of said CANOpen medical apparatuses is started, and a time at which a user inputs an initiation signal into each of said CANOpen medical apparatuses; and each of said CANOpen medical apparatuses being configured to intercept an error message at that apparatus when the error message occurs, and to parameterize the intercepted error message in the electronic apparatus using the imported message object parameters of the message object to produce a parameterized error message, and to automatically respond to the error message by administering the parameterized error message.

10. A system as claimed in claim 9 wherein said device configuration file is generated from an electronic data sheet.

11. A method for administering error messages having addressable access to device variables comprising:

providing a plurality of CANOpen medical apparatuses and interfacing said CANOpen medical apparatuses to communicate with each other according to the CANOpen standard via a CANOpen bus;

configuring said CANOpen medical apparatuses with an electronic device configuration file according to the CANOpen standard, and extending said device configuration file to include a message object therein and message object parameters associated with the message object, to produce an extended device configuration file;

importing of the message object with the associated message object parameters from the extended device configuration file into the CANOpen medical apparatuses;

intercepting an error message at one of said CANOpen medical apparatuses when the error message occurs at said one of said CANOpen medical apparatuses;

parameterizing the intercepted error message in one of said CANOpen medical apparatuses using the imported message object parameters of the message object to produce a parameterized error message; and automatically electronically responding to the error message by administering the parameterized error message by at least one of modifying existing error messages, deleting existing error messages, and generating new error messages.

12. A method as claimed in claim 11 comprising importing said message object at a time selected from the group consisting of a time at which each of said CANOpen medical apparatuses is started, an automatically selected time, and a time designated by a user-implemented input into each of said CANOpen medical apparatuses.

13. A non-transitory computer-readable storage medium encoded with programming instructions for administering error messages in a system comprising a plurality of CANOpen medical apparatuses and an interface allowing said CANOpen medical apparatuses to communicate with each other according to the CANOpen standard via a CANOpen bus, said programming instructions causing said system to:
   configure said CANOpen medical apparatuses with device configuration file according to the CANOpen standard, to include a message object therein and message object parameters associated with the message object, to produce an extended device configuration file;
   Import the message object with the associated message object parameters from the extended device configuration file into the CANOpen medical apparatuses;
   intercept an error message at one of said CANOpen medical apparatuses when the error message occurs at one of said CANOpen medical apparatuses;
   parameterize the intercepted error message in one of said CANOpen medical apparatuses using the imported message object parameters of the message object to produce a parameterized error message; and
   automatically respond to the error message by administering the parameterized error message by at least one of modifying existing error messages, deleting existing error messages, and generating new error messages.

14. A system for administering error messages comprising:
   a plurality of CANOpen medical apparatuses and an interface allowing said CANOpen medical apparatuses to communicate with each other according to the CANOpen standard via a CANOpen bus;
   a memory containing an electronic device configuration file according to the CANOpen standard;
   a processor configured to extend said device configuration file to include a message object therein and message object parameters associated with the message object, to produce an extended device configuration file;
   said processor being configured to import the message object with the associated message object parameters from the extended device configuration file into said CANOpen medical apparatuses; and
   each of said CANOpen medical apparatuses being configured to intercept an error message at that apparatus when the error message occurs, and to parameterize the intercepted error message in the electronic apparatus using the imported message object parameters of the message object to produce a parameterized error message, and to automatically respond to the error message by administering the parameterized error message by at least one of modifying existing error messages, deleting existing error messages, and generating new error messages.

15. A system as claimed in claim 14 wherein said processor is configured to import said message object at a time selected from the group consisting of a time at which each of said CANOpen medical apparatuses is started, and a time at which a user inputs an initiation signal into each of said CANOpen medical apparatuses.

* * * * *